United States Patent [19]
Moe, Jr. et al.

[11] 3,741,158
[45] June 26, 1973

[54] PRE-CONDITIONING PROCESS FOR INDUCED SPAWNING
[75] Inventors: Martin A. Moe, Jr., Juno Isles; Jay P. Dunathan, Tequesta, both of Fla.
[73] Assignee: Oceanography Mariculture Industries, Inc., Riviera Beach, Fla.
[22] Filed: Nov. 29, 1971
[21] Appl. No.: 202,809

[52] U.S. Cl. ............................................... 119/3
[51] Int. Cl. ........................................... A01k 61/00
[58] Field of Search .................................... 119/2–4

[56] References Cited
UNITED STATES PATENTS
3,572,291 3/1971 Cavanagh .............................. 119/3

Primary Examiner—Louis G. Mancene
Assistant Examiner—J. A. Oliff
Attorney—Norman F. Oblon et al.

[57] ABSTRACT

A process for pre-conditioning of fish in preparation for induced spawning which comprises isolating a brood stock of sexually immature or inactive fish from the natural environment by placing the stock into a water media suitable for sustaining life in a healthy condition, whereby water quality, temperature and degree of light exposure and light intensity can each be selectively controlled, adjusting the temperature and degree of light exposure and intensity so that sexual development of the blood stock is suppressed until spawning is desired and thereafter readjusting the temperature and degree of light exposure and intensity so that sexual maturity of the brood stock is rapidly attained.

6 Claims, 2 Drawing Figures

PRE-CONDITIONING PROCESS FOR INDUCED SPAWNING

BACKGROUND OF THE INVENTION

1. Field of the Invention:

This invention relates to a technique for pre-conditioning fish in order to prepare them for induced spawning, and more particularly to a technique whereby a fish culture can be maintained in a suitable condition such that the spawning capability of the fish can be readily controlled and regulated.

2. Description of the Prior Art:

Recent increased commercial interest in the large-scale cultivation, or "farming" of fish, as an additional source of food supply, has generated renewed interest in the use of induced spawning procedures as one technique for stabilizing the farming output, or for controlling the timing of maximum output to coincide with optimum marketing conditions. Although the technique of induced or artificial spawning does provide some degree of control over the extent and timing of the farming output, this control is limited to the period of from the time the fish attain spawning maturity until the period in which natural spawning begins. A greater degree of control would be obtainable if the sexual development of the fish could be suppressed until spawning were desired. Under this condition, the fish population could be maintained for a much longer period of time, without spawning, so that a constant input supply could be available as needed for the farming operation.

Even if sexual development could be suppressed, however, it would additionally be necessary to provide some technique for rapidly maturing the fish to bring them up to spawning capacity, otherwise the gains achieved by sexual suppression would be lost by the subsequent extended delay time required for normal maturation.

A need exists, therefore, for a technique in which the sexual development of a fish culture can be suppressed for an extended period of time and thereafter brought up to full sexual maturity and spawning capacity.

SUMMARY OF THE INVENTION

Accordingly, it is an object of this invention to provide a technique for controlling the spawning capacity of the fish culture in order to control the degree of farming output.

Another object of this invention is to provide a technique for suppressing the sexual development of the fish culture, so that the culture can be maintained for an extended period of time without spawning.

A further object of this invention is to provide a technique for enhancing the sexual development of the fish culture in order that it can be rapidly matured to full spawning capacity as required.

These and other objects have now herein been attained by the process of isolating a stock of juvenile fish in an artificial environment in which selective control can be attained over the water temperature, the degree of light exposure, and the degree of light intensity.

When it is desired to suppress sexual development, a relatively cold water temperature is maintained, depending upon the particular species being cultivated, and the extent of light exposure and intensity is minimized. The environmental conditions during this period are selected such that the fish population will be maintained in an active, healthy condition, except that gonad development will be suppressed. When spawning is desired, the water temperature is increased and the extent of light exposure and intensity is increased so that full gonad development is rapidly attained.

DETAILED DESCRIPTION OF PREFERRED EMBODIMENTS

In discussing this invention, reference shall be primarily made to the species pompano, Trachinotis carolinus, which is one of the most tasty of the salt water food fishes. It should be recognized, however, that pompano is referred to herein only for the purposes of illustrating the invention, and the invention is not intended to be limited only to this particular species. In fact, this invention can be practiced with any of the large variety of fresh water or estuarine type fishes, including: mullet, snapper, grouper, sea trout, flounder, porgies, catfish, tilapia, trout and tropical, fresh and salt water aquarium fishes.

Figure 1:
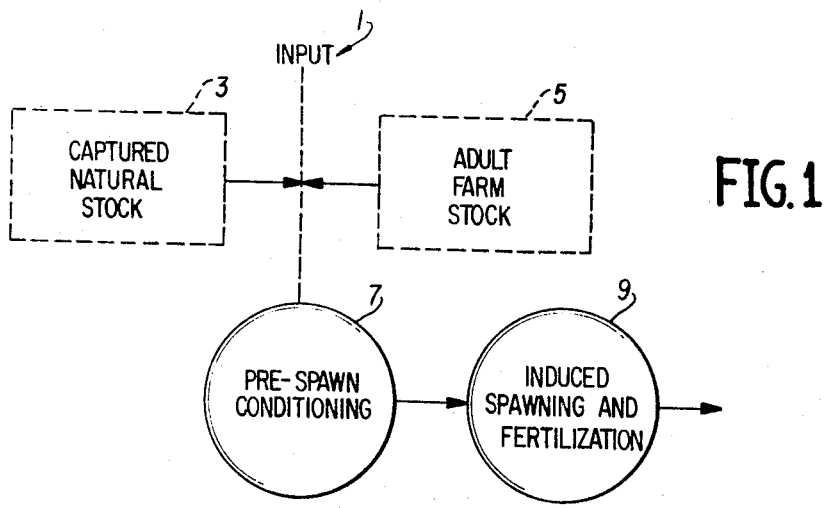
FIG. 1 is a schematic of the conditioning procedure of this invention.

A schematic of the conditioning procedure of this invention is shown in FIG. 1. As can be seen from the schematic, the input brood stock 1 is isolated from either natural stock 3 or by recycling a portion of the product from the later stages of the process 5 or partially from each source. The brood stock is maintained under conditions of light, temperature and fish density which are designed to suppress growth and sexual maturity, so that an input supply will be available as demanded by the process requirements. When spawning is desired, the inactive or immature brood stock 1 is subjected to prespawn conditioning 7 in which the light, temperature and fish density are readjusted so that maximum growth and sexual development is obtained. The stock is then treated by conventional techniques to induce natural or forced spawning and fertilization 9.

BROOD STOCK MAINTENANCE

In the first stage of the process, a suitable brood stock of juvenile fish having immature or inactive sex organs is isolated, either from natural sources or from a portion of the product developed in the later stages of the process, or from a combination of both sources, for subsequent use as an input source for the mariculture.

The isolated stock is then placed into a controlled environment which is designed to suppress the normal maturation and development of the fish. The purpose of this technique is to provide an input brood stock supply which can be quickly brought to full spawning maturity as supply and process conditions require. This technique removes the spawning procedure from the unpredictableness of natural environmental conditions, so that spawning can be regulated and adapted for use in economical fish farming operation.

If a suitable natural supply of juvenile fish is available, however, the isolation of the brood stock can be either entirely or partially eliminated and the natural stock can be used directly in the subsequent prespawning procedure. Where the natural supply is used to supplement the brood stock held under artificial environmental conditions, the natural source should be held in quarantine for a reasonable period of time to prevent possible contamination of the artificially maintained stock.

The quality and quantity of light, temperature and fish density used in the artificial environment should be selected such that the sexual maturation of juvenile fish will be suppressed until spawning is desired. The particular light, temperature and fish density parameters which will yield the best results in terms of suppression of gonad development will depend upon the particular species of fish being raised. For instance, where species stimulated by decreasing photoperiods (such as mullet) are being bred, it is desirable to provide a very long period of light exposure, whereas when fish stimulated by increasing photoperiods are being bred, such as pompano, it is desirable to considerably reduce the extent of light exposure.

It has been found that sexual maturation of pompano will be suppressed when light exposure is limited to a period of between 7 hours and 11 hours per 24-hour period, and most preferably between about 8½ to 10½ continuous hours per 24-hour period. This period is just less than the 11-hour winter photoperiod of the South Florida area. The short photoperiod prevents the liberation of gonadotropic hormones from the pituitary gland. The intensity of light should simulate natural conditions as closely as possible, and good results are attainable when the intensity is between 500 and 1,000 foot candles. This light intensity can be obtained by the use of a high intensity fluorescent fixture in conjunction with incandescent bulbs.

If desired, natural sunlight can be used as the light source by providing a suitable shield to limit the period of sunlight exposure. Regardless of the light source, however, it is essential that an interval of gradually increasing or decreasing light intensity precede each change from light period to dark period in order to simulate periods of natural dawn and dusk. It has been found that sudden changes in the light intensity can cause severe shock and panic in the fish population, which can not only cause severe immediate destruction, but can be responsible for inhibiting subsequent spawning. For the same reason, it is also desirable to provide a source of low intensity light, (0.01 foot candles) even during the dark period, in order to prevent disorientation of the fish, which could likewise cause severe immediate and/or long term damage.

The water temperature of the brood stock environment should be relatively low, depending upon the particular species. It has been found that the rate of growth and maturity of most species, including pompano, will be substantially lower in relatively colder waters than in warmer waters under otherwise similar environmental conditions. Consequently, the water temperature should be carefully adjusted to below the normal summer environmental temperature for the particular species. For instance, where the species being bred is pompano, it is desirable to maintain the water temperature at between 19°C. and 23°C.

All other environmental conditions in the controlled environment brood stock should be selected so as to simulate as closely as possible the natural environmental conditions of the species in order that the brood stock will remain in as healthy condition as possible, suitable for further processing. A relatively high fish population density is acceptable in this stage.

It has been found that fish which are held under high density conditions will mature at a much slower rate because of metabolites and other organic compounds in the water. However, good water quality is also essential, and it is preferable to rely on environmental controls (e.g., photoperiod and temperature) other than high population density to suppress sexual maturation.

The brood stock may be maintained in a land-borne or sea-borne tank, vessel, or container. However, since the purpose of isolating the brood stock is to decrease or eliminate the dependency of fish growth on natural environmental conditions, it is most desirable to provide a tank system which is completely removed from the natural habitat of the particular fish species. The size of the container or vessel is not particularly critical, except that a sufficient capacity must be provided to assure proper aeration, recirculation, filtering and fish density.

Large temperature fluctuations in the water medium will have a deleterious effect on the growth and spawning capacity of the fish, and accordingly, it is desirable that such fluctuations be carefully regulated so that the water temperature will not vary by more than 1 or 2 °C. in any 24-hour period.

All other conditions in the artificial environment, other than light, temperature, and fish density, should be fairly constant and should correspond as closely as possible to the most favorable natural conditions for the particular species being raised. The salinity of the water, the rate of water recirculation, and the degree of filtration should be regulated as closely as possible to simulate natural environmental conditions. When pompano is being raised, the salinity of the water should be maintained between 15 and 35 parts per thousand, water recirculation should occur as often as 40 times per day, and the filtration system should be adequate to remove or convert ammonia nutrients and particulate waste occurring in the environmental waters, as well as similar impurities from the system.

If desired, a plurality of tanks or containers may be provided and the development of the brood stock may occur, either concurrently within each container, or alternatively, the degree of brood stock development may vary from container to container in order to provide a uniform input supply for breeding purposes.

Figure 2:
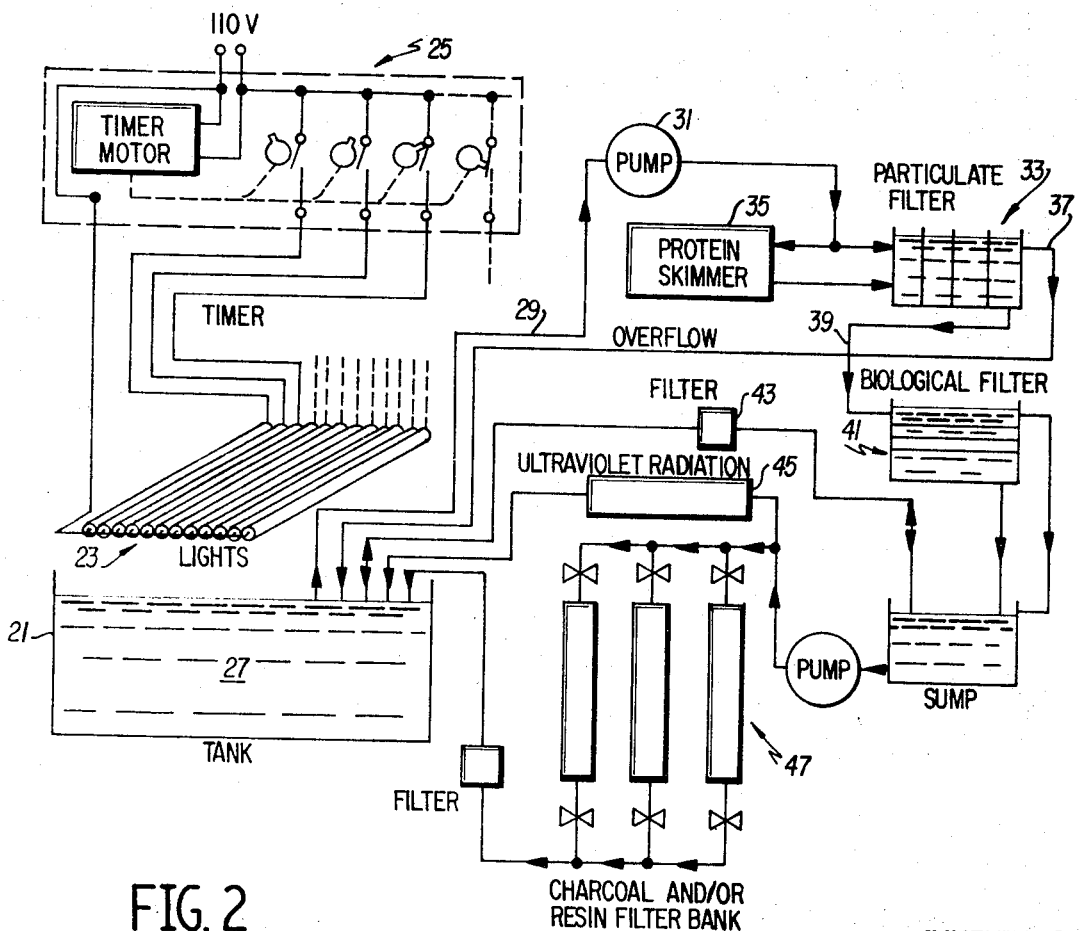
FIG. 2 is a schematic of one suitable brood stock maintenance system which may be used in this invention.

One suitable brood stock maintenance system is shown in FIG. 2, wherein a tank 21 is shown with an artificial light source 23 and a control timer 25 for controlling the periods of relative lightness and darkness in the tank. Water 27 is pumped through a conduit 29 by means of pump 31 to a particulate filter 33 which acts to remove solid impurities, food fragments and the like. A portion of the impure water from conduit 29 is subjected to a conventional protein skimmer treatment 35 for the removal of high molecular weight organic substances prior to being subjected to the particular filter 33. Particulate matter is permitted to settle to the bottom of the filter tank while the overflow is recirculated through conduit 37 back to holding tank 21. The bottoms from the particulate filter is then passed through conduit 39 into a biological filter 41, and then into filter element 43, ultraviolet radiation treatment tank 45, and charcoal or resin filter bank 47. By the combined use of ultraviolet radiation, particulate, biological and resin or charcoal filters, the by-product toxins, fecal matter and decomposed food particles and the like can be removed from the system.

This system is further described in, and is the subject matter of, copending application Ser. No. 66,826, filed Aug. 25, 1970 now U.S. Pat. No. 3,661,262.

When the species being raised is pompano, the tank waters may be exchanged up to 40 times per day and the period of light and darkness may be obtained at a ratio of about 7 : 9 to 15 : 17 hours per 24-hour period. The periods of dawn and twilight should last about 20 minutes to 40 minutes, with increasing or decreasing light intensity of 100 to 10 foot candles during the dusk period and about 10 to 100 foot candles during the dawn period.

PRE-SPAWN CONDITIONING

During pre-spawn conditioning period, the brood stock is subjected to conditions which will promote rapid sexual maturity and full development of the fish gonads, in order to prepare the fish for spawning. In order to provide this result, the stock is subjected to the opposite conditions of light, temperature and fish density as those which prevail during brood stock maintenance. In other words, where the species is a fish that spawns on increasing photoperiod, the light duration is increased, the water temperature is increased, and the fish density is decreased.

Where the fish species is pompano, the duration of light treatment is increased to about 16 to 19 continuous hours per 24-hour period, using the same type of light source as that used during the brood stock maintenance stage. Periods of light and darkness should continue to be preceded by a gradually diminishing or increasing light intensity in order to simulate twilight and dawn conditions. A source of low intensity light should continue to be used during the dark periods in order to prevent fish disorientation.

It is essential during this period that the temperature be maintained at between 25°C. to 29°C. as determined by the normal temperature ranges during the spawning period in nature or slightly above, and the fluctuations in temperatures should be carefully controlled to within about 1° to 3°C.

The degree of fish population density is not essential. However, of course, it should be below the maximum limit that the system can support without distressing the fish.

The remaining environmental requirements of water salinity, aeration, filtration, and recirculation should remain substantially the same as described for the brood stock maintenance. The particular pre-spawning environmental conditions, of course, will vary depending upon the particular species being raised. The length of time required for pre-spawning, will depend largely upon the natural sexual development rate of the particular species. Where pompano is being raised, full maturity of the fish gonads will ordinarily occur within 6 weeks from initiation of pre-spawn conditioning, and the exact time required can be readily determined by periodic biopsy of samples from the fish culture.

The facilities required for pre-spawn conditioning may be substantially similar to those used in the brood stock maintenance period described in FIG. 2, although since the fish density must be reduced, the size and capacity of the holding tanks or containers may vary somewhat from those used during the brood stock maintenance period.

If desired, more than one tank or container may be provided so that the rate of maturation will occur either concurrently or sequentially in each tank, so as to provide an optimum source of input for the subsequent spawning procedure.

As indicated above, the brood stock input to the pre-spawn conditioning stage may consist of captured natural stock and/or juvenile products from the later stages of the mariculture.

INDUCED SPAWNING

Once sexual maturity of the brood stock has been attained, as evidenced by adequate gonad development of selected specimens, the pre-spawn conditioning period can be terminated. The individual fish in the stock are then subjected to conventional hormone treatments for the purpose of inducing spawning. As is well known, certain hormones will stimulate hormone secretions by the ovary to force ovulation. Such hormone treatments conventionally consist of either one or two sequences of injections of a pituitary extract over a period of several days. If spawning and fertilization are to proceed by voluntary processes in the brood stock container, only pituitary extract of the particular species should be used.

In an alternative approach, ovulation can be forced by injecting human chorionic gonadotropin (HCG), together with a pituitary extract, into the fish and the sperm and eggs can be physically extracted from the fish. The eggs can then be fertilized by being mixed with the sperm and transferred to the hatching and incubation system.

Where pompano is the species being raised, two to three injections per day of from 0.5 to 1.0 cc. per kilogram weight, of pituitary extract is usually sufficient to induce natural ovulation, and from one to two injections per day of from 250 to 500 International units per kilogram weight, of HCG in combination with a pituitary extract is sufficient to force ovulation.

The required aeration, filtration, circulation and environmental control may be the same as those used during the pre-spawn conditioning, although a much wider variation in light control, environmental temperature and fish density can be tolerated.

In principle, all stages of the process may be carried out in sequence in the same container or in a series of containers, although it is preferable to use a separate container or containers for each stage. It is most preferable, however, especially when the number of conditioned fish is large, to remove the stock from the pre-spawn conditioning system in small groups to facilitate observation and treatment as induced spawning proceeds.

Having generally described the invention, a further understanding can now be obtained by reference to certain specific examples which are presented herein for purposes of illustration only and are not intended to be limiting in any manner.

EXAMPLE

A brood stock of 200 pompano (Trachinotus carolinus) both male and female types, average age 2 years, were collected in a controlled environment land-based tank having an inside capacity of 9,000 gallons. The fish density was 0.8 pounds of fish per cubic feet. This stock was captured from a wild population in the coastal waters of Florida.

A light source of eight, 40 watt fluorescent bulbs having intensity of 320 watts was provided to supply 8 hours of continuous daylight type light per 24 hours period. A low intensity light source, an incandescent bulb having an intensity of 7 ½ watts, was used during the period of relative darkness. The water environment was controlled so as to have a salinity of 30 to 35 parts per thousand, temperature of 70°C. and maximum temperature fluctuation of 2°C., pH 7.7 to 8.1. Water was recirculated through the filtering system at the rate of 5 times per 24 hour period. The stock was fed with 1½ pounds of prepared moist food at intervals of 3 times per 24 hour period. The brood stock was maintained in the system under these conditions for 90 days. Examination of the gonads of selected samples from the stock showed that the full sexual maturity had not yet occurred at the end of this period.

The brood stock was then transferred into a second tank system having an internal capacity of 2,000 gallons. The density in this second system was 0.1 pounds of fish per cubic feet. The same conditions of salinity, pH, recirculation and filtration as in the first tank were provided in the second tank as well. The period of light exposure using a similar light source to that as described above was increased to 15 continuous hours per 24 hour period which was preceded and succeeded by 45 minutes of gradually increasing or decreasing light intensity. During the dark period, a low light intensity source of 3 watts was used to prevent disorientation of the fish population. The temperature of the tank was 28°C. with temperature fluctuations of ±1°C. The stock was fed with 8 ounces of shrimp or prepared food as described above.

Full sexual maturity as determined by the development of fully matured gonads was obtained after 10 weeks.

The brood stock was then transferred to a spawning tank; temperature 27°C. ±1°C.,pH 7.9, salinity 35 percent. Each specimen of the stock was injected once per day for 2 days with 0.5 cc. of HCG and 0.5 cc. of pompano pituitary extract and their eggs and sperm were physically removed, mixed and placed in an egg separation tank. The live eggs were separated from the dead eggs using the natural buoyancy of the live fertilized eggs and draining the bottom portion of the tank containing the dead eggs. Incubation of the eggs occurred in a tank having a capacity of 120 gallons, recirculation rate of 1 change/15 minutes, water temperature 26°C., 8.1 pH, salinity 35 percent, degree of aeration strong. After 1 day, hatching of the eggs appeared to be imminent as determined by microscopic examination and eggs were transferred to a static type hatching and larvae rearing tank, temperature 26°C. ±.5°C. pH, 8.1, salinity 35 percent, aeration moderate. The eggs were permitted to hatch and the larvae was retained for 25 days. The larvae were fed cultured rotifers and copepods at abundance levels of 3 to 5 organisms per cc.

At the end of 3 weeks, the fingerlings were transferred to a tank similar to that described above for pre-spawning conditioning in order that they can be developed to juvenile stage.

The conversion factor, which is defined as the pounds of fish produced per pound of food, was 2.5. That means that it require approximately 2.5 pounds of food to produce 1 pound of pompano.

It should be clearly understood that although considerable reference in the specification has been made to pompano, it will be apparent that many other varieties of maritime and fresh water fish can be raised in the same manner, simply by varying the specific environmental parameters. Accordingly, having now fully described the invention, many changes and modifications will be apparent to one of ordinary skill in the art without departing from the spirit or scope of the invention.

What is claimed as new and intended to be secured by letters patent is:

1. A process for pre-conditioning pompano in preparation for induced spawning which comprises isolating a brood stock of sexually immature fish from the natural environment by placing the stock into a water media suitable for sustaining life in a healthy condition, limiting the light exposure to a period of between 8 and 10 continuous hours per 24 hour period during which the intensity of light is between 500 and 1,000 foot candles and the water temperature is maintained between 90°C. and 23°C. for suppressing the sexual development of the brood stock until spawning is desired, and thereafter readjusting the temperature and degree of light exposure and intensity by increasing the period of light duration to about 16 continuous hours per 24 hour period using a light source having an intensity of between 500 and 1,000 foot candles and the water temperature is maintained at between 25°C. and 29°C. for rapidly attaining the sexual maturity of the brood stock.

2. The process of claim 1, wherein the fish density of the brood stock is relatively higher during the period in which sexual maturity is being suppressed than during the period in which sexual maturity is being attained.

3. The process of claim 1, wherein the brood stock is isolated by being placed in a tank having a particulate and biological filtration system and a recirculation system suitable for maintaining the quality of the water sufficient for maintaining the brood stock in a healthy condition.

4. The process of claim 1, wherein each period of light exposure is preceded and succeeded by a period of gradually increasing and decreasing light intensity, respectively, to avoid shock or panic to the brood stock.

5. The process of claim 4, wherein each period of light exposure is preceded and succeeded by a period of 20 to 40 minutes of gradually increasing and decreasing light intensity, respectively, to avoid shock or panic to the brood stock.

6. The process of claim 1, wherein spawning of the brood stock and egg fertilization is induced by treating the stock with a suitable hormone extract.

* * * * *